June 15, 1937.    W. A. PITT, JR    2,084,259
TRANSMISSION ASSEMBLY FOR GENERATOR DRIVES
Filed March 27, 1936    2 Sheets-Sheet 1
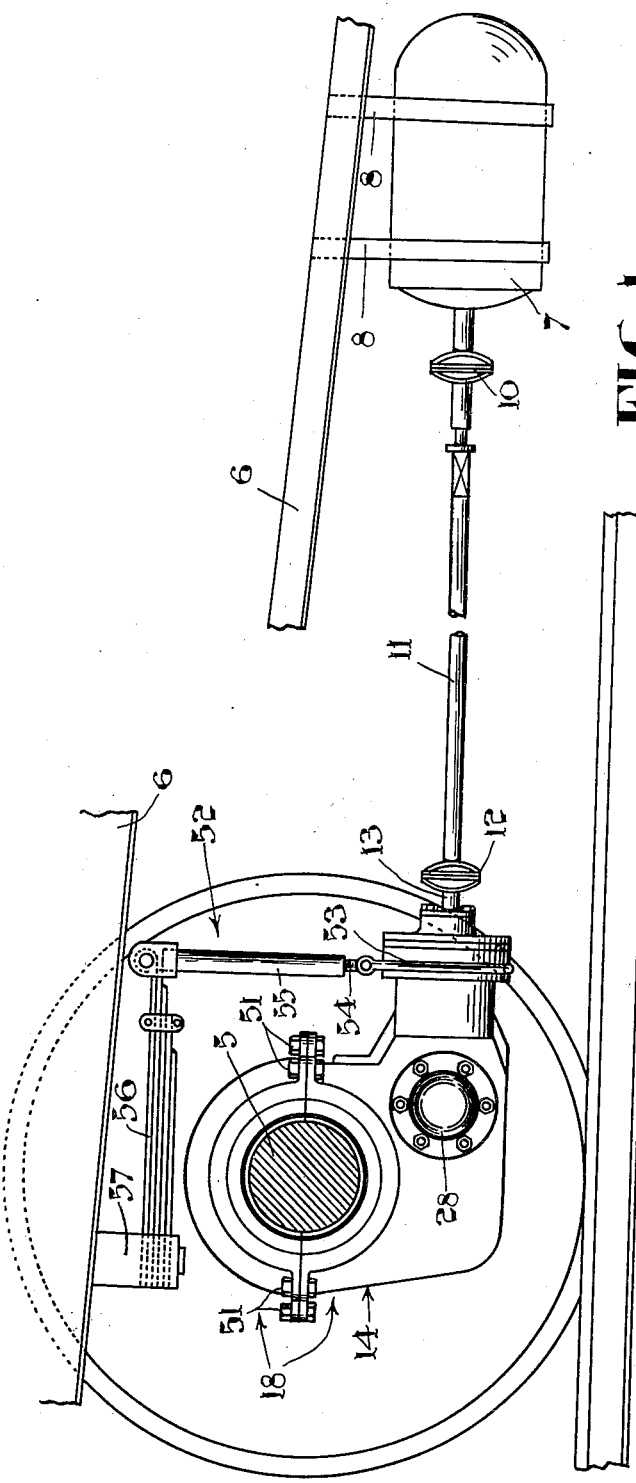
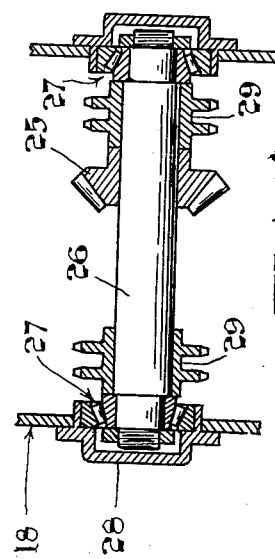
INVENTOR
WILLIAM A. PITT JR.
BY J. D. O'Connell
ATTORNEY June 15, 1937.  W. A. PITT, JR  2,084,259
TRANSMISSION ASSEMBLY FOR GENERATOR DRIVES
Filed March 27, 1936   2 Sheets-Sheet 2

INVENTOR
WILLIAM A. PITT, JR.
BY J. D. O'Connell
ATTORNEY

Patented June 15, 1937

2,084,259

UNITED STATES PATENT OFFICE 2,084,259

TRANSMISSION ASSEMBLY FOR GENERATOR DRIVES

William A. Pitt, Jr., Montreal, Quebec, Canada, assignor to George F. Sheppard, Westmount, Quebec, Canada Application March 27, 1936, Serial No. 71,141

1 Claim. (Cl. 105—101)

This invention relates to an improved transmission assembly for driving a generator from one of the truck axles of a railway car. The object is to provide a silent and completely enclosed transmission mechanism which is of sufficiently rugged construction to meet all requirements of heavy duty service.

Other objects and advantages, as well as the novel details of construction, will appear from the following description taken in connection with the accompanying drawings, wherein—

Fig. 1 is a side elevation showing the application of my improved transmission assembly to a railway car.

Fig. 4 is a sectional detail view showing the mounting of the jack shaft.

Figure 3:
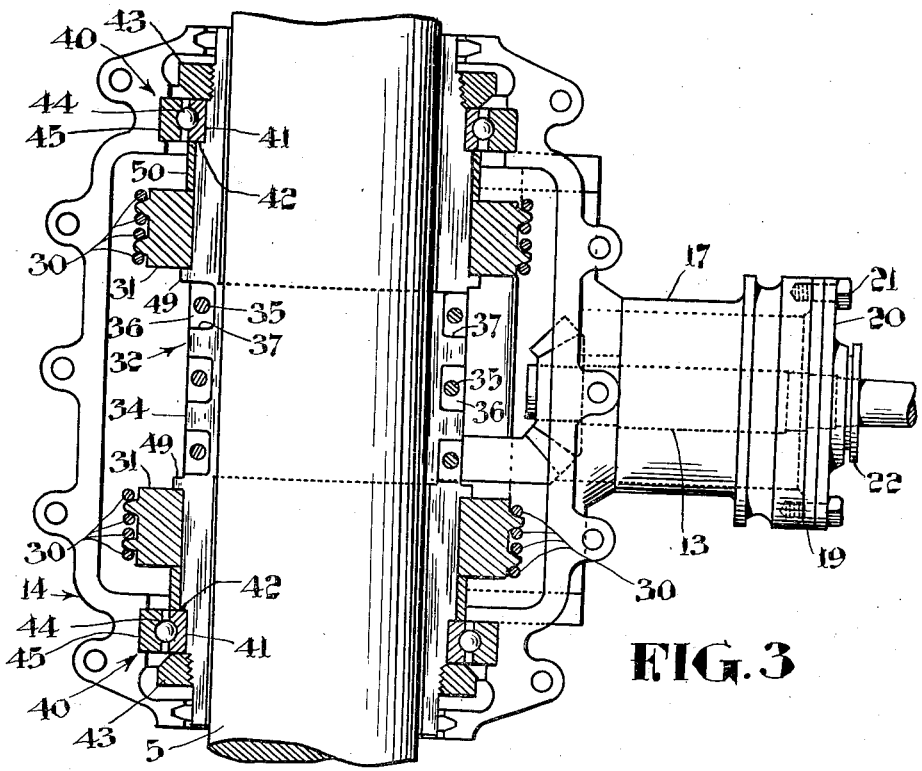
Fig. 3 is a sectional view along the line 3—3 of Fig. 2.
Figure 2:
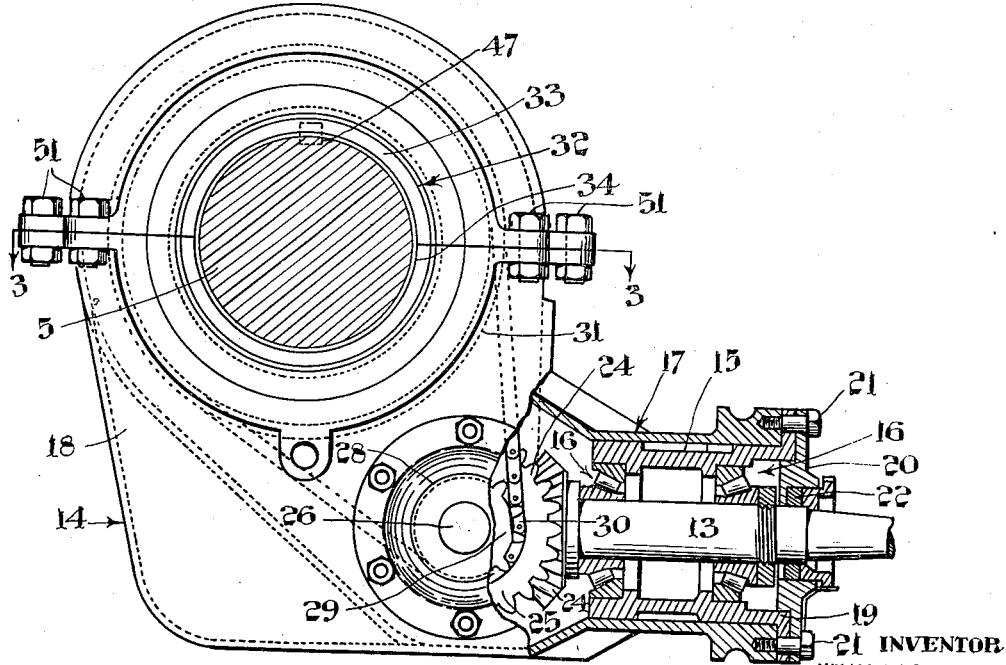
Fig. 2 is a side elevation of the transmission, per se, with parts broken away to show the driving connection between the jack shaft and the tail shaft.

Referring more particularly to the drawings, 5 designates one of the truck axles of a railway car, 6 the underframe of the car body and 7 a generator which is suspended from the underframe as indicated at 8. The generator shaft is connected, by a flexible coupling 10, with one end of a tubular drive shaft 11. The other end of shaft 11 is connected, by flexible coupling 12, to a tail shaft 13 forming part of the improved transmission assembly generally indicated at 14.

The tail shaft 13 extends through a sleeve 15 in which it is rotatably mounted by suitable ball bearings 16. Sleeve 15 is fitted in a tubular extension 17 of the transmission casing 18. The outer end of sleeve 15 is provided with a flange 19 which bears against the outer end of the tubular extension 17. A cover plate 20 is fitted to the flange 19 and is secured in place by bolts 21. This cover plate is provided with a packing gland 22 through which the shaft 13 extends.

The inner end of shaft 13 carries a bevel pinion 24 meshing with a bevel pinion 25 fixed to a jack shaft 26. The ends of the jack shaft 26 are journalled in ball bearings 27 carried by cap members 28 fastened in openings formed in opposite sides of the casing 18. Shaft 26 also carries a pair of duplex sprockets 29 which are connected, by chains 30, with duplex driving sprockets 31. The sprockets 31 are carried by a sleeve 32 which is fixed to rotate with the axle 5. As here shown, sleeve 32 comprises two half sections 33 and 34 which are clamped to the axle by bolts 35 passing through lugs 36 formed in recessed portions 37 of the sleeve.

The transmission casing 18 is rotatably mounted on the ends of sleeve 32 by means of ball bearings 40. The inner races 41 of these bearings are clamped in place between the sleeve shoulders 42 and the clamping nuts 43, the outer races 44 being fitted in recessed portions 45 of the casing. It will thus be seen that the two halves of sleeve 32 are held together by the sprockets 31, ball bearings 40 and nuts 43 as well as by the bolts 35. Sleeve 32 is keyed to axle 5 as indicated at 47.

The sprockets 31 are held against axial displacement on the sleeve by the sleeve shoulders 49 and suitable spacing bands 50, the latter being interposed between the sprockets and the inner races of the bearings 40. Sprocket 31 is also keyed to sleeve 32.

Casing 18 is divided into upper and lower sections bolted together as indicated at 51 so that the meeting faces of said sections coincide with the meeting faces of the sleeve sections 33 and 34. This construction enables the casing and sleeve to be conveniently assembled on the axle 5 and also facilitates the assembly of the remaining parts of the complete transmission. It will be noted, also, that casing 18 provides a complete enclosure for the parts comprising the drive connection between the axle and the tail shaft.

As shown to advantage in Fig. 1, the tubular extension 17 of the transmission casing 18 is supported from the car underframe 7 by spring suspension means generally indicated at 52. This suspension means is the same as that described in U. S. Patent 1,786,401 granted Dec. 23, 1930. It comprises a shackle 53 supporting the extension 17 and secured to the eye of a bolt 54 which is threaded into a suitable sleeve 55. The sleeve 55 is pivotally suspended from the free end of a laminated leaf spring 56, the other end of which is fastened to a supporting bracket 57.

The transmission assembly described herein represents a definite improvement in generator drives for railway cars. The transmission of power from the axle to the jack shaft through the chain and sprocket drive connections eliminates the objectionable noisy operation characteristic of transmission mechanisms in which the jack shaft is driven from the axle by intermeshing gears. It also provides a flexible type of drive connection which is more durable than the gear type and stands up better under hard usage.

The transmission casing is designed and mounted on the sleeve 32 so that it completely encloses the component elements of the chain and sprocket drive connections between the sleeve and the jack shaft, as well as the component elements of the drive connection between the jack shaft and the tail shaft. In addition to reducing frictional resistance the anti-friction bearings mounting the transmission casing in sleeve 32 serve to close off the axle openings of the casing so that it is possible to use oil in the casing for lubricating purposes without excessive loss of oil through leakage between the casing and the ends of the sleeve. The sleeve 32 and the parts forming the drive connection between this sleeve and the jack shaft are designed for heavy duty service, it being noted that the sections of the sleeve are of relatively heavy construction and are firmly clamped to the axle in addition to being held in place around the axle by the sprockets 31 and the encircling portions of the anti-friction bearings provided between the sleeve and the transmission casing.

Assembly and disassembly of the tail shaft 13 is also materially facilitated by the mounting of this shaft in anti-friction bearings carried by the sleeve 15, which may be readily inserted in the tubular extension 17 of the transmission casing or is readily removed therefrom. The assembly and disassembly of the jack shaft 26 is also facilitated by the manner in which the ends of this shaft are journalled in anti-friction bearings carried by cap members fitted in openings formed in opposite sides of the transmission casing.

Having thus described what is now conceived to be the preferred embodiment of this invention it will be understood that various modifications may be resorted to within the scope and spirit of the appended claim. For example, the anti-friction bearings provided for mounting the transmission casing, jack shaft and tail shaft may be in the form of roller bearings instead of the ball bearings described herein. The chain drive connections provided between the sleeve on the car axle and the jack shaft may also be of the triplex instead of the duplex type.

Having thus described my invention, what I claim is:—

A transmission assembly for driving a generator from one of the truck axles of a railway car comprising a split sleeve having a central portion provided with axially spaced lateral shoulders, securing lugs formed on the complemental central portions of the sleeve sections between said shoulders, one of said sleeve sections being keyed to the axle, securing elements passed through said lugs for clamping the sleeve sections together on the axle at the central portion of said sleeve, said sleeve at its ends being diametrically reduced to provide additional shoulders spaced axially from said first named shoulders, clamping nuts threaded over the ends of said sleeve, anti-friction bearings at each end of said sleeve and having their inner races clamped between said clamping nuts and the said additional sleeve shoulders in the reduced portions of the sleeve, a transmission casing enclosing said sleeve, said bearings having their outer races seated in the end portions of said transmission casing whereby the casing is rotatable relative to the axle and the sleeve, a pair of sprockets fixedly mounted on said sleeve, each sprocket having its inner side abutting against one of said lateral sleeve shoulders at the end of the central portion of the sleeve, annular spacer bands disposed over said sleeve between the outer sides of the sprockets and the said inner races of the bearings, a jack shaft journaled in the lower portion of said transmission casing so as to lie below and parallel with the axle, sprockets fixed to said jack shaft and having chain connection to the sprockets on said sleeve, said transmission casing having a tubular extension extending laterally therefrom in the zone of the sleeve central portion and perpendicular with respect to the sleeve axis, a tail shaft rotatably mounted in said tubular extension of the casing, and the inner end of said tail shaft being geared to said jack shaft in the zone of the central portion of said sleeve between said sprockets.

WILLIAM A. PITT, Jr.